Figure 1:
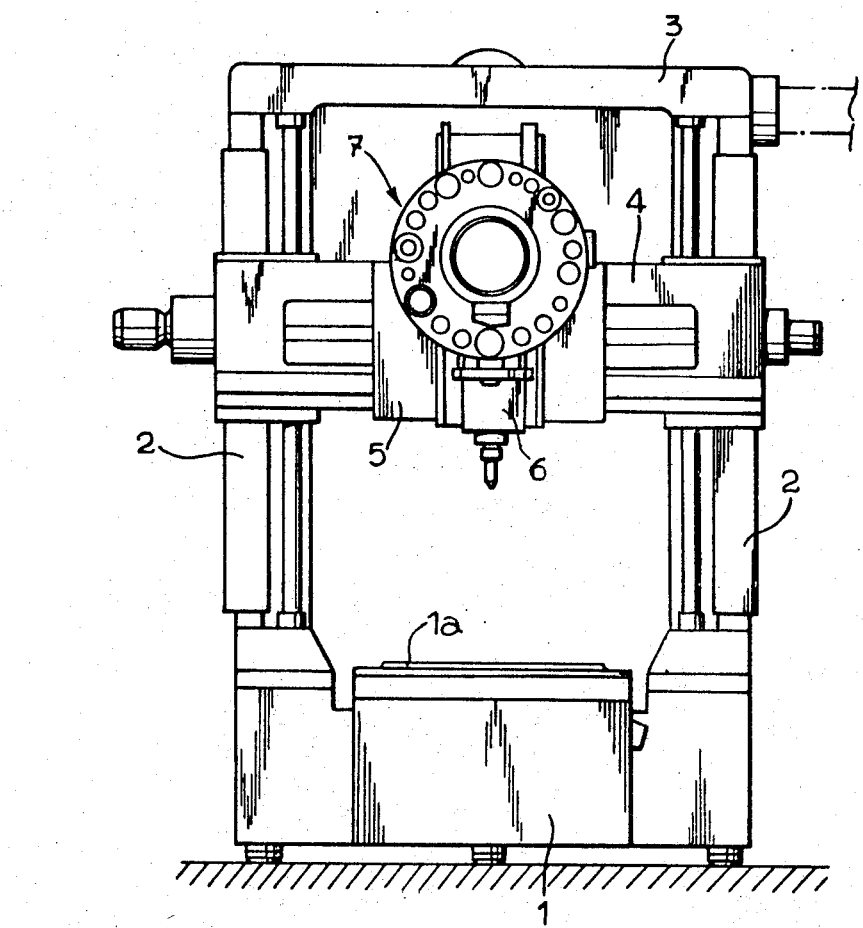

Oct. 3, 1967 M. ZUCCHELLINI 3,344,512
DIGITAL CONTROL MACHINE TOOLS
Filed Sept. 8, 1966 5 Sheets-Sheet 5

United States Patent Office 3,344,512
Patented Oct. 3, 1967

3,344,512
DIGITAL CONTROL MACHINE TOOLS
Mosé Zucchellini, Turin, Italy, assignor to Fiat Società per Azioni, Turin, Italy
Filed Sept. 8, 1966, Ser. No. 577,885
Claims priority, application Italy, Sept. 17, 1965, 21,036/65
8 Claims. (Cl. 29—568)

The invention relates to digital control machines arranged for a programmed automatic tool change. More particularly, the invention relates to the rotation of a selected tool-holding sleeve in a tool-holding magazine of such a machine.

In machines of the type to which the invention relates, a device for effecting a programmed automatic tool change has been proposed which comprises a tool magazine forming a part of a drum arrangement rotatable on the machine frame adjacent an operating spindle, the device also comprising a movable arm for picking a selected tool from the magazine. At a given time the tool from a previous machining step is removed from the spindle and the selected tool transferred to a location opposite the spindle. The tool is then inserted into the spindle and the tool from the preceding machining operation transferred to the magazine. In such a machine the tools are coded for convenient selection and hydraulic and electric means are provided for effecting angular rotation of the magazine, dependent upon the position of the selected tool and for operating the aforementioned movable arm.

It has also been proposed that machines of this type should utilise a rotatable tool magazine which carries on its periphery a plurality of sleeves mounted for oscillation on radial forks fast with the magazine. The sleeves hold the tools employed by the machine for the various machining steps and under normal inoperative conditions and during rotation of the magazine the sleeves are themselves maintained in an inoperative position with their axes parallel to the rotational axis of the drum. When replacement of a tool becomes necessary, the sleeve carrying the selected tool is moved to a tool change station and is rotated about its pivotal axis so as to be placed orthogonally with respect to the rotational axis of the drum so that the movable arm may effect replacement.

An object of the present invention is to improve on the arrangement whereby the sleeve carrying the selected tool is rotated for changing over from an inoperative position to a position suitable for tool change.

A further object of the invention is to provide a device of the abovementioned type, which is simple and tough in construction, reliable and accurate in operation, and adapted to change over automatically from the one position to the other and automatically to correct any errors in phase of the drum.

According to a further object, the invention consists in a digital control machine tool including an arrangement for varying the angular position of a selected tool holding sleeve in a rotary magazine, the said arrangement comprising, in association with an annular track shaped to engage rollers carried by the said sleeve, an oscillatable cradle located at an interruption of the said track at a tool change station and carrying a track selection matched to replace the interruption, the said cradle being oscillatable under the control of a double-acting hydraulic piston and cylinder arrangement and such oscillation of the cradle being transmitted to a tool holding sleeve, the roller of which sleeve is engaged in the cradle track section.

Figure 2:
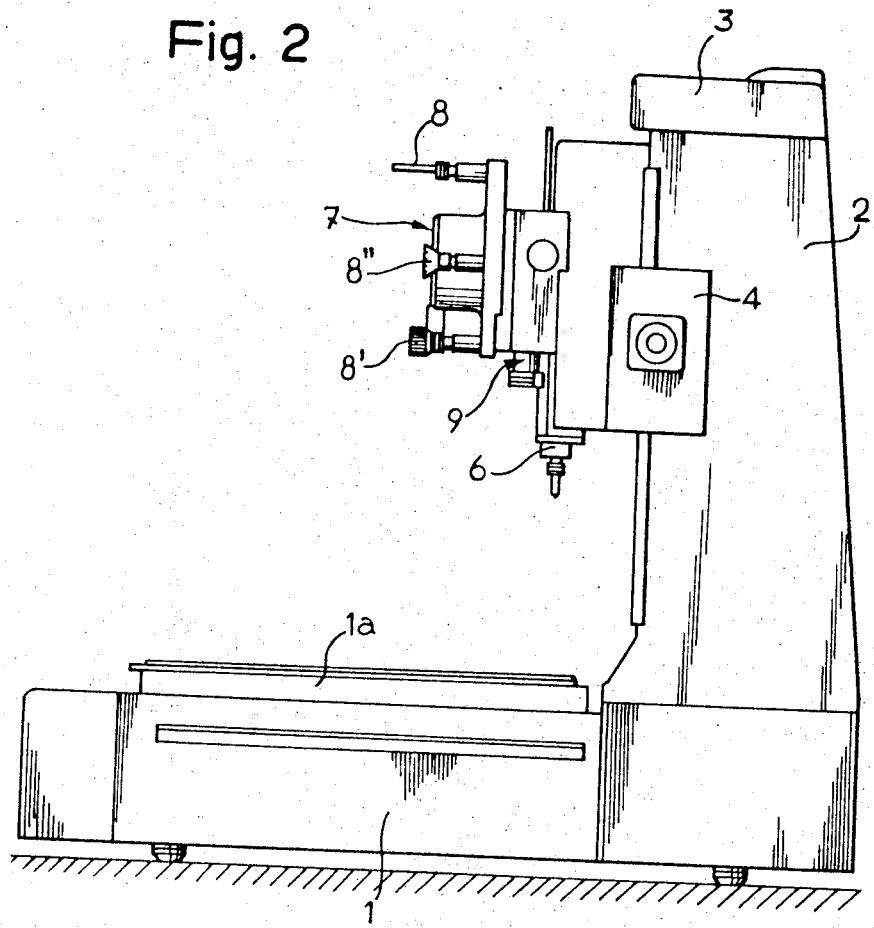
Figure 3:
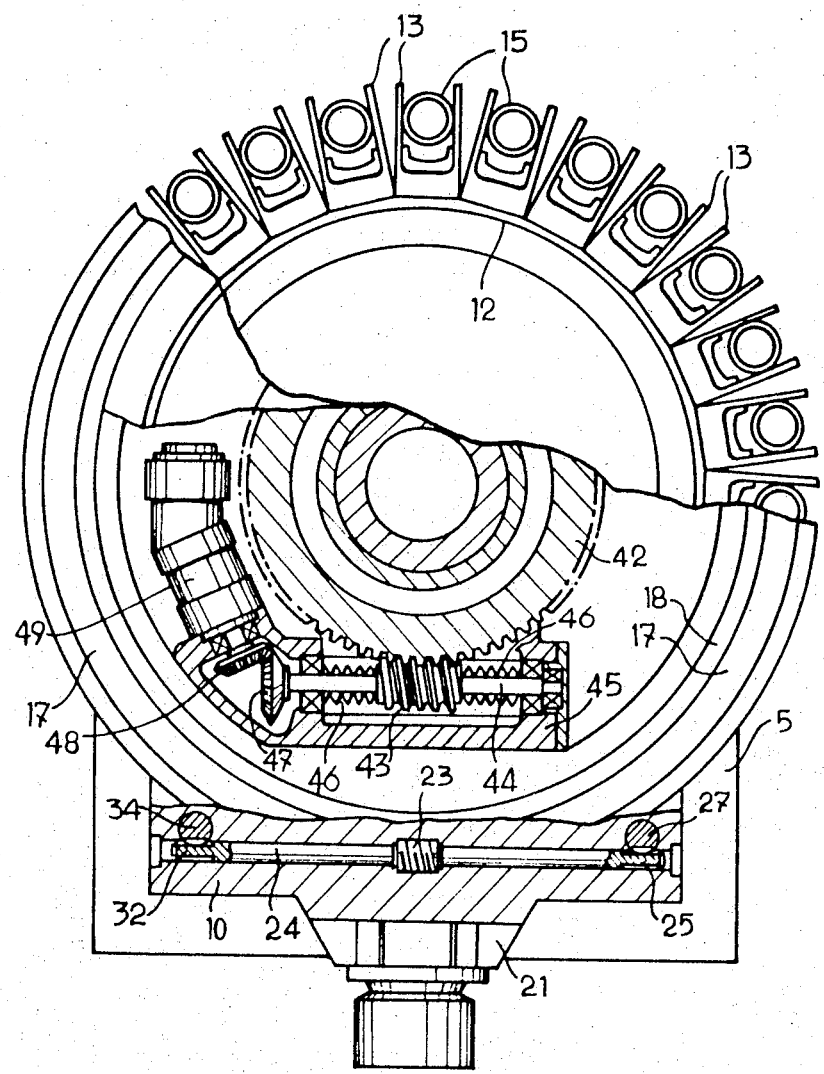
Figure 4:
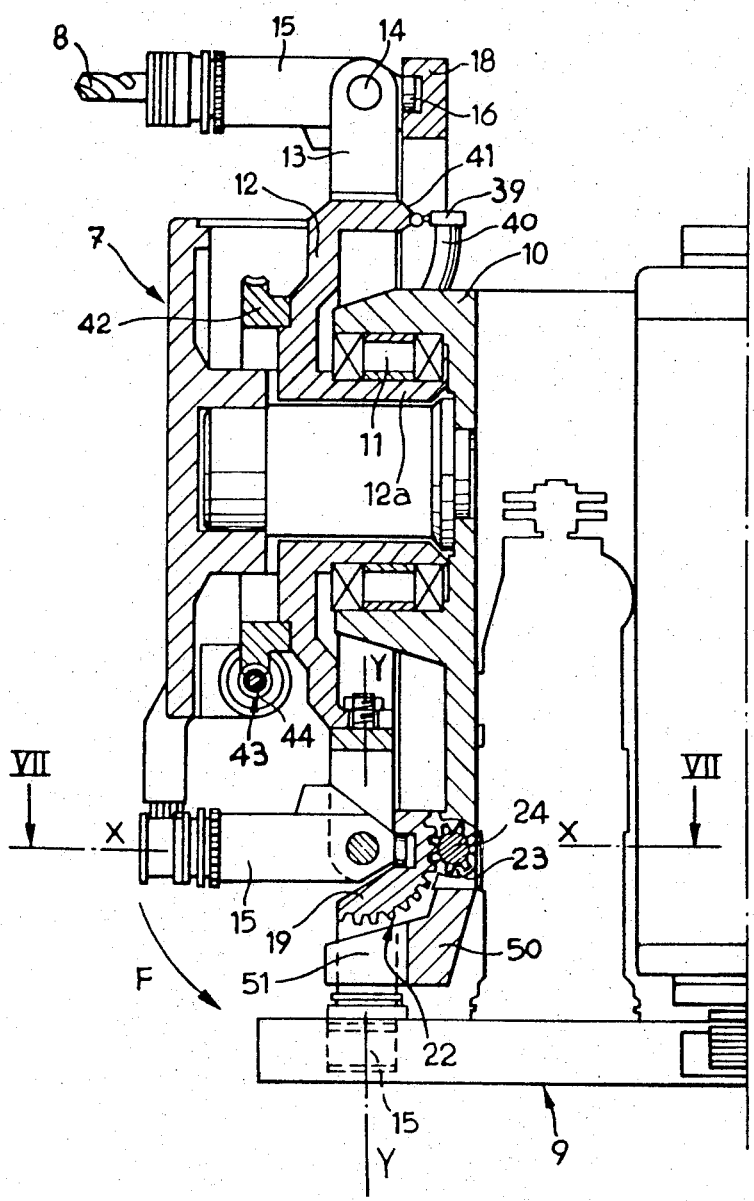
Figure 5:
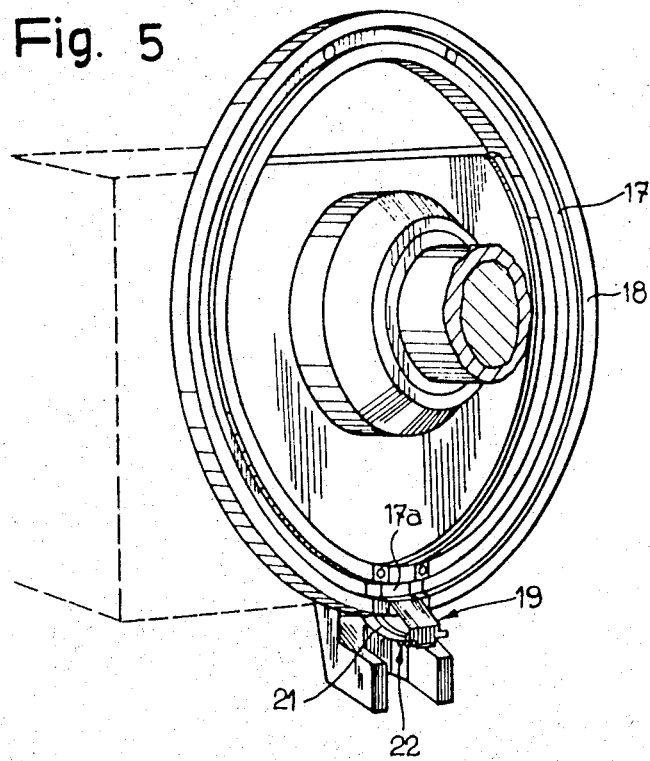
Figure 6:
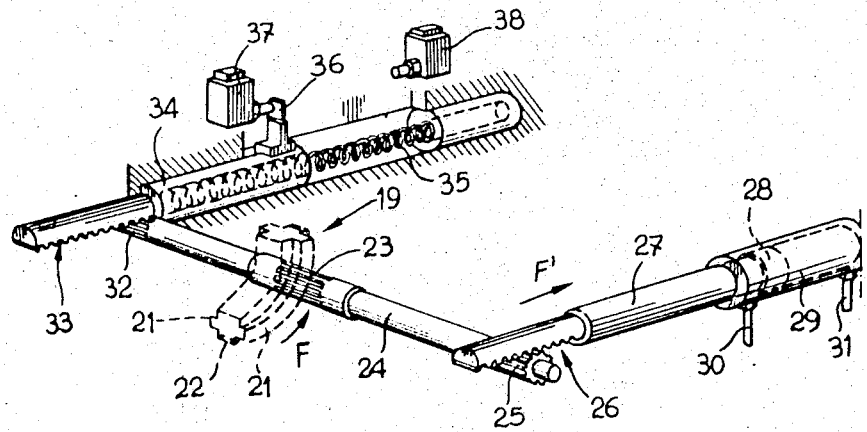

These and other objects and advantages of the invention will be clear from the following description, given with reference to the accompanying drawings which are by way of example and in which:

FIGURE 1 is an elevational front view of a digital control machine tool according to the invention;
FIGURE 2 is an elevational side view of the machine;
FIGURE 3 is a diagrammatical part sectional front view of a tool magazine and operating means therefor;
FIGURE 4 is an axial sectional view taken along line IV—IV of FIGURE 3;
FIGURE 5 is a perspective view of the guide device for the tool holding sleeves;
FIGURE 6 is a diagrammatical perspective view of the means for effecting rotation of the selected tool holder; and
FIGURE 7 is a cross sectional view on an enlarged scale taken along line VII—VII of FIGURE 4.

In FIGURES 1 and 2, there will be seen the bedplate 1 of a machine tool according to the invention, having mounted on its upper face a workpiece slide 1a capable of longitudinal displacement. A frame is arranged at one end of the bedplate 1 and comprises two lateral pillars 2 and a top transverse member 3. A slide 4 is movable vertically up and down the pillars 2 and carries a further and horizontally movable slide 5. The slide 5 has secured thereto a frame comprising an operating spindle 6 and a rotary drum magazine 7 for the tools, the magazine carrying a plurality of tools 8, 8', 8" adapted to be selectively substituted for a tool secured to the spindle 6 by a movable arm 9 which is shown only diagrammatically in the abovementioned figures.

With reference to FIGURES 3 and 4 it will be seen that the said tool magazine 7 comprises a stationary support 10 fast with the slide 5 and thus capable of horizontal movement. The support 10 has mounted thereon, through the interposition of rolling means 11, the tool holding drum which comprises a frame 12 centrally provided with a cylindrical bushing 12a and radially carrying a plurality of forks 13. Each of the forks supports a tool holding sleeve 15 for oscillation about a transverse pivot 14 and the sleeves each carry at their rear end opposite the tool a rotatable roller 16. Each roller 16 is adapted to roll in an annular track 17 formed in a guide ring 18 which is fast with the stationary member 10 of the support.

Figure 7:
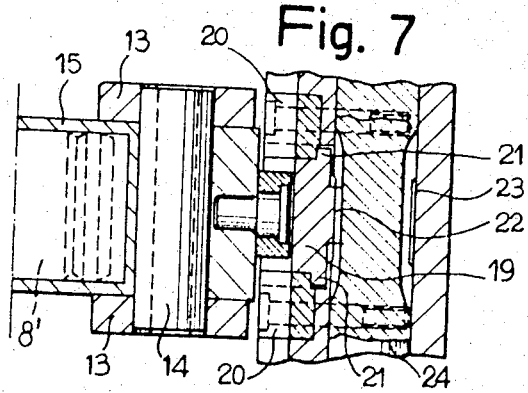

At the tool change station, which is situated at the lower region of the machines and shown generally in FIGURE 5, and more specifically in FIGURES 4 and 7, the track 17 and guide ring 18 are interrupted. A cradle shaped oscillating member 19 is arranged at the interruption and is connected with the stationary frame by means of two shaped guides 20 cooperating with two arcuate ledges 21 situated one on each side of the cradle 19. The cradle carries on its outer face a toothed sector 22 which meshes with a pinion 23 carried by a transverse shaft 24 supported by the support 10.

As is best seen from FIGURES 3 and 6, the shaft 24 carries at one end a pinion 25 cooperating with a track 26 carried by a rod 27. The said rod is linked to a piston 28 of a fluid pressure cylinder 29 which is arranged in the support 10. The cylinder 29 is of the double-acting type and is formed with two connectors 30, 31 for supply of a fluid under pressure. The shaft 24 has secured to its other end a similar pinion 32 which cooperates with a rack 33 secured to a slidable tube 34 biased by a spring 35 and provided with a radial extension 36 adapted alternately to cooperate with two microswitches 37, 38.

In the inoperative condition of the tool holding sleeves the fluid pressure cylinder 29 is fed with pressure fluid through the connector 31 so as to maintain the piston in the position shown in FIGURE 6, in which position there is prevented any rotation of the shaft 24 and thus of the cradle 19. In this position the cradle is so arranged that a groove or track section 17a therein is aligned with the remaining track 17 to permit rotation and axial displacement of the tool holding sleeves.

When a selected tool holder is stopped at the tool-change station, the roller 6 on the tool holder is engaged by the groove section 17a in the cradle 19. A microswitch 39 carried by an extension 40 (see FIG. 4) fast with the stationary support 10 cooperates with a raised part 41 on the drum 12 in order in indicate the presence of the selected tool at the change station. At this stage feed of the pressure fluid to the cylinder 29 is reversed, the fluid now entering the cylinder via the connector 30 and the connector 31 serving as the discharge. The rack 26 is operated in the direction of the arrow F' (FIG. 6) and rotates the shaft 24. The pinion 23 of the said shaft now rotates the cradle 19 in the direction of the arrow F and the cradle carries with it the selected tool sleeve 15 which is engaged in the groove 17a thereof. This causes movement of the sleeve through an angle of about 90° in the direction of the arrow F in FIGURE 4 and the said sleeve is rotated from its initial position denoted by the axis X—X to its end position for tool transfer denoted by the axis Y—Y.

A support 50 is arranged beneath the tool change station and is formed with a recess 51 shaped for receiving the selected tool sleeve 15 at the end of its rotation, so that any errors in phase are corrected as the shaped recess automatically moves the sleeve 15 and drum to their accurate transfer or tool-change position.

In order that the cradle may be prevented from rotating downwardly under its own weight when there is deficient oil pressure, the shaft 24 is retained by the rack 33 which is fast with the tube 34 biased by the spring 35. At the start of operations the extension 36 carried by the slidable tube 34 contacts the microswitch 37 which ensures accurate positioning of the cradle in its inoperative position. At the end of its stroke the extension 36 engages the other microswitch 38, this indicating that the cradle and selected sleeve have completed their rotation and allowing the subsequent tool transfer steps.

As shown in FIGURES 3 and 4 rotation of the drum is effected by a rotary hydraulic motor 49 having keyed to its shaft a conical pinion 48 which cooperates with a similar pinion 47. The latter is keyed to the end of a shaft 44 supported by a stationary frame 45. The shaft 44 has centrally keyed thereto a worm screw 43 which cooperates with a toothed rim 42 fast with the movable portion 12 of the drum. According to a preferred feature of the invention the worm screw 43 is slidably keyed to the shaft 44 and is arranged between two symmetrical sets of cup-shaped springs 46 which normally maintain it in its central position. With this arrangement there is compensation for any auxiliary displacement imparted by the previously described phasing arrangement. As will be evident the slight auxiliary displacements imparted to the drum by the said phasing arrangement are taken up by the springs 44 which permit slight displacement by the screw 43. The screw is of course allowed to return to its normal position when the drum is next started again.

The above described device is simple and tough in construction and permits transfer of a selected tool holding sleeve 15 from its inoperative to its transfer or tool change position in an accurate manner while automatically compensating any errors in positioning. With the device as described the elaborate complex constructions adopted in the past for the same purposes in machines of this type are avoided.

Various modifications of the invention are of course possible within the scope of the appended claims.

What I claim is:
1. A digital control machine tool including an arrangement for varying the angular position of a selected tool holding sleeve in a rotary magazine, the said arrangement comprising, in association with an annular track shaped to engage rollers carried by the said sleeves:
    (A) an oscillatable cradle, and
    (B) a double-acting hydraulic piston and cylinder arrangement,
the said cradle having formed therein a track section dimensioned to match and replace an interruption formed in the said annular track at a tool change station where said cradle is located, the said cradle being oscillatable under the influence of the said hydraulic arrangement and oscillation of the said cradle being transmitted to a toolholding sleeve, the roller of which sleeve is engaged in the cradle track section.

2. A machine according to claim 1 further comprising a toothed sector carried by the said cradle, a pinion on a shaft and a rack, the said pinion being driven by the rack and the said rack being movable by the hydraulic arrangement.

3. A machine according to claim 2, wherein the said rack is fast with the piston of the said hydraulic arrangement.

4. A machine according to claim 1 further comprising a phase member arranged at the said tool change station, the said phasing member itself comprising a support with a recess therein shaped to receive a selected said sleeve and to guide it, if necessary, into an accurate tool change position.

5. A machine according to claim 1 wherein the said cradle is provided with lateral arcuate ledges therein which are adapted to engage slidingly with a stationary part of the said machine.

6. A machine according to claim 1 wherein means are provided for allowing compensation for inaccuracy in positioning of the said magazine at the said tool change station, a motor and gear train being provided for rotation of the said magazine to such a position.

7. A machine according to claim 6 wherein the said gear train comprises a worm screw reducing gear and a worm toothed rim and the said compensating means comprise an operating shaft on which the said screw is axially keyed and springs carried by the said shaft at each side of the said screw to permit slight axial displacement of the said screw.

8. A machine according to claim 6 wherein the said motor is an hydraulic motor.

References Cited

UNITED STATES PATENTS 3,052,011  9/1962  Brainard _____ 29—568

RICHARD H. EANES, JR., *Primary Examiner.*